H. T. HOOKER.
Cultivator-Teeth.
No. 40,935.    Patented Dec. 15, 1863.
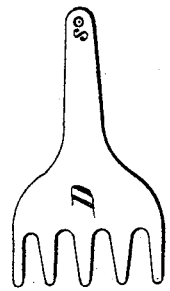
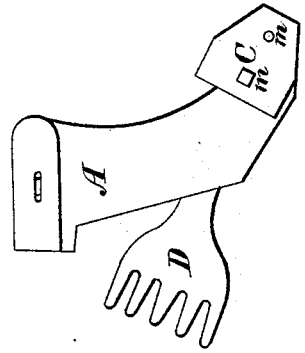
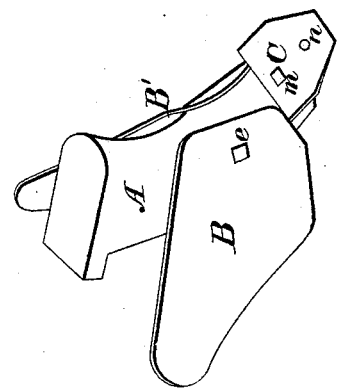
Witnesses:
K. H. C. Preston
Henry C. Hooker.
Inventor:
Henry T. Hooker

UNITED STATES PATENT OFFICE.

HENRY T. HOOKER, OF SKANEATELES, NEW YORK.

IMPROVEMENT IN CULTIVATORS.

Specification forming part of Letters Patent No. 40,935, dated December 15, 1863.

*To all whom it may concern:*

Be it known that I, HENRY T. HOOKER, of the town of Skaneateles, in the county of Onondaga and State of New York, have invented a new and useful improvement in the teeth or points of cultivators and of similar instruments for pulverizing and loosening the soil in various departments of agriculture; and I do hereby declare that the following is a full, clear, and exact description of the construction and operation of the same, reference being had to the annexed drawings, making a part of this specification, in which—

Figure 1 represents a perspective view of the tooth and attachments complete. Fig. 2 represents a bird's-eye view of the tooth with point and follower, but without the wings. Fig. 3 represents a transverse section of the follower. Fig. 4 represents a transverse section of the front plate. Fig. 5 represents a vertical section of the same.

In a long experience with various cultivators I have found all that I could obtain seriously deficient in operation, either failing sufficiently to loosen the soil or not cutting off the weeds under the soil, but rather turned aside by them and by the various obstructions met, thus rendering them difficult to be held to their place, and requiring the exercise of much strength and care, and also that nearly all of them have been difficult of draft and tiresome to the horses employed upon them.

I have succeeded in making a cultivator with the points flat, so as to cut off under the surface the roots of the weeds met with in cultivating, and also having the front or cutting plate or point distinct from the rest of the tooth and not forming a part of it, so as in the case of the ordinary plow-point to break and loosen the ground before the wings or other appliances for removing the soil shall have met it, and that thus no obstruction shall be opposed to the wings or shares which shall turn them aside from their course, or shall impede them, so as greatly to increase the draft.

In the figures alluded to in this specification, and forming a part of the same, A represents the body of the tooth, which is commonly made of cast-iron, and is nearly similar in shape to those in ordinary use upon other cultivators.

B B' are wings or shares, of steel or iron, shaped like the mold-board of a common plow, so as easily to remove or turn the soil outward as the cultivator proceeds. I usually make them of about No. 12 wire gage plate-steel, and fasten them to the body of the tooth by one or more bolts, $e$, of which the heads are countersunk in the share, so as not to present an obstruction. The wings are easily removed, and are used or dispensed with according to the nature of the soil and the use to which the cultivator is put.

I find in practice it is sometimes best to put two wings on the front or center tooth, and one on each of the following teeth, upon the outside of the tooth, to remove the soil from the line in which the cultivator proceeds toward the outside, as in the case of hilling corn or other crop which requires the soil to be thrown upon the hills between which the cultivator proceeds. In other cases I find it best to put the following wings upon the inside of the tooth to throw back the soil loosened by the first tooth, thus accomplishing a thorough stirring of the ground; and sometimes it is best to dispense with the wings altogether.

The attachment D in Fig. 2, and of which a plan view from above is represented in Fig. 3, is attached to the cultivator-tooth by a bolt through the hole $s$, and which bolt is the same as used for holding the front plate represented at $m$. The object of this is to stir and break the soil which has first been loosened by the steel plate C. It is made so as to be easily detached, and can be used in combination with the other attachments of the tooth, or can be entirely left off, as the case requires.

Figs. 4 and 5 represent a sectional and plan view of the steel plate or point upon the front of the tooth. This is made of some hard metal, usually steel, and I prefer to have it about one-eighth ($\frac{1}{8}$) inch thick. The opposite faces of the plate or their cutting-edges are made, the one perfectly straight, the other tapering toward a point, as represented in the figure. The faces are ground to a cutting-edge. There are two holes, $m$ $n$, in the plate, countersunk upon opposite sides of the plate, one to receive a bolt, the other to fit a projection cast upon the tooth, and are so situated relatively to each other that when the plate is turned exactly over, so as to bring the other cutting-edge forward, the hole which previously received the bolt will fit the projection upon the tooth, and that which fitted the tooth will receive the countersunk bolt.

I have constructed these plates or points perfectly flat, in distinction to the curved-shaped teeth in common use, so as to present the least impediment to entering the ground and being drawn through it while completely dividing and breaking it. I attach the plates at such an angle to the tooth as to hold the cultivator well in the ground, while not so flat as to offer serious resistance to the soil.

What I claim is—

The standard A, provided with the reversible share C, detachable mold-boards B B', and pulverizer D, the whole constructed, arranged, and operating in the manner and for the purpose herein set forth.

HENRY T. HOOKER.

Witnesses:
 K. H. C. PRESTON,
 HENRY C. HOOKER.